US012463563B2

United States Patent
Lipton et al.

(10) Patent No.: US 12,463,563 B2
(45) Date of Patent: Nov. 4, 2025

(54) ELECTROSTATIC CLUTCH

(71) Applicants: University of Washington, Seattle, WA (US); U.S. Army Research Laboratory, Adelphi, MD (US)

(72) Inventors: Jeffrey Lipton, Seattle, WA (US); Joshua R. Smith, Seattle, WA (US); Timothy Amish, Seattle, WA (US); Jeffrey Auletta, Seattle, WA (US); Chad Christopher Kessens, Seattle, WA (US)

(73) Assignees: University of Washington, Seattle, WA (US); U.S. Army Research Laboratory, Adelphi, MD (US)

( * ) Notice: Subject to any disclaimer, the term of this patent is extended or adjusted under 35 U.S.C. 154(b) by 0 days.

(21) Appl. No.: 18/911,899

(22) Filed: Oct. 10, 2024

(65) Prior Publication Data
US 2025/0125746 A1    Apr. 17, 2025

Related U.S. Application Data

(60) Provisional application No. 63/589,536, filed on Oct. 11, 2023.

(51) Int. Cl.
*F16D 28/00* (2006.01)
*H02N 13/00* (2006.01)

(52) U.S. Cl.
CPC ............. *H02N 13/00* (2013.01); *F16D 28/00* (2013.01)

(58) Field of Classification Search
CPC .................................. H02N 13/00; F16D 28/00
See application file for complete search history.

(56) References Cited

U.S. PATENT DOCUMENTS

| 2,850,907 | A | * | 9/1958 | Foster | B41J 9/40 74/25 |
| 4,393,967 | A | * | 7/1983 | Cuomo | H02N 13/00 192/84.4 |
| 2017/0222576 | A1 | * | 8/2017 | Majidi | F16D 27/00 |

(Continued)

OTHER PUBLICATIONS

Balakrishnan, C., "Johnsen-rahbek effect with an electronic semiconductor," British journal of applied physics, 1950, 1(8), 211-213.

(Continued)

*Primary Examiner* — Farhana Pervin
(74) *Attorney, Agent, or Firm* — McDonnell Boehnen Hulbert & Berghoff LLP

(57) ABSTRACT

An electrostatic clutch includes a shaft having an electrically conductive first layer. The clutch also includes a hold attachment rotatably coupled to the shaft and a tension band having an electrically conductive second layer. The tension band is wrapped around the shaft such that a first end of the tension band is coupled to the hold attachment. The clutch includes a dielectric material disposed between the first layer and the second layer and a load attachment rotatably coupled to the shaft. The clutch is configured for an engaged mode where a voltage applied between the first layer and the second layer causes the tension band to clasp the shaft and the load attachment and the hold attachment to be rotationally locked to the shaft, and for a disengaged mode where the voltage is absent and the shaft can rotate freely with respect to the load attachment and the hold attachment.

20 Claims, 5 Drawing Sheets

(56) References Cited

U.S. PATENT DOCUMENTS

| | | | |
|---|---|---|---|
| 2018/0143687 A1* | 5/2018 | Moessinger | F16D 28/00 |
| 2019/0107157 A1* | 4/2019 | Schmitz | H02N 13/00 |
| 2020/0081532 A1* | 3/2020 | Yoon | G06F 3/0383 |
| 2024/0213892 A1* | 6/2024 | Diller | F16D 65/125 |

OTHER PUBLICATIONS

Billard et al., "Trends and challenges in robot manipulation," Science, 2019, 364(6446), 1149, 11 pages.

Cacucciolo et al., "Peeling in electroadhesion soft grippers", Etreme Mechanics Letters, 2022, vol. 50, 101529, 8 pages.

Chen et al., "A comparison of critical shear force in low-voltage, all-polymer electroadhesives to a basic friction model", Smart materials and structures, 2017, 26(2), 025028, 12 pages.

Diller et al., "A lightweight, low-power electroadhesive clutch and spring for exoskeleton actuation," IEEE International Conference on Robotics and Automation (ICRA), 2016, 682-689.

Diller et al., "The effects of electroadhesive clutch design parameters on performance characteristics," Journal of Intelligent Material Systems and Structures, 2018, 29(19), 3804-3828.

Feizi et al., "Design and Modeling of a Smart Torque-Adjustable Rotary Electroadhesive Clutch for Application in Human-Robot Interaction", IEEE Robotics & Association Society, 2023, 11 pages.

Fitch, C.J., "Development of the Electrostatic Clutch", IBM Journal of Research and Development, 1957, 1(1), 49-56.

Guo et al., "A soft and shape-adaptive electroadhesive composite gripper with proprioceptive and exteroceptive capabilities", Materials and Design, 2018, vol. 156, 586-587.

Guo et al., "Electroadhesion Technologies for Robotics: A Comprehensive Review", IEEE Transactions on Robotics, 2020, 36(2), 313-327.

He et al., "Underactuated robotics: A review", International Journal of Advanced Robotic Systems, 2019, 16(4), 1-29.

Hinchet et al., "DextrES: Wearable Haptic Feedback for Grasping in VR via a Thin Form-Factor Electrostatic Brake". Proceedings of the 31st Annual ACM Symposium on User Interface Software and Technologies, 2018, 901-912.

Hinchet et al., "High Force Density Textile Electrostatic Clutch", Advanced Materials Technologies, 2020, 5(4), 1900895, 7 pages.

Johnsen et al., "A Physical Phenomenon and Its Applications to Telegraphy, Telephony, Etc.", Journal of the Institution of Electrical Engineers, 1923, 713-725.

Kanno et al., "Generation mechanism of residual clamping force in a bipolar electrostatic chuck", Journal of Vacuum Science & Technology B: Microelectronics and Nanometer Structures, 2003, 21(6), 2371-2377.

Kanno et al., "Prediction of clamping pressure in a Johnsen-Rahbek-type electrostatic chuck based on circuit simulation", Journal of vacuum science & technology. B, Microelectronics and nanometer structures processing, measurement and phenomena, 2006, 24(1), 216-223.

Karagozler et al., "Electrostatic Latching for Inter-module Adhesion, Power Transfer, and Communication in Modular Robots", IEEE/RSJ International Conference on Intelligent Robots and Systems, 2007, 2779-2786.

Lancaster et al., "Electrostatic Brakes Enable Individual Joint Control of Underactuated, Highly Articulated Robots", The International Journal of Robotics Research, 2020, 1-18.

Lancaster et al., "Optical Proximity Sensing for Pose Estimation During In-Hand Manipulation", IEEE/RSJ International Conference on Intelligent Robots and Systems (IROS), 2022, 11818-11825.

Levine et al., "Materials with Electroprogrammable Stiffness", Advanced Materials, 2021, 33(35), 2007952, 26 pages.

Mastrangelo et al., "Electroadhesion zipping with soft grippers on curved objects", Extreme Mechanics Letters, 2023, vol. 61, 101999, 11 pages.

Mastrangelo et al., "High-force soft grippers with electroadhesion on curved objects", IEEE 5th International Conference on Soft Robotics (RoboSoft), 2022, 384-389.

Nakamura et al., "Modeling and control of electroadhesion force in DC voltage", Nakamura and Yamamoto Robomech Journal, 2017, 4(18), 10 pages.

Persson, B. N. J., "The dependency of adhesion and friction on electrostatic attraction", The Journal of Chemical Physics, 2018, 148(14), 144701, 8 pages.

Plooij et al., "Lock your robot: A review of locking devices in robotics," IEEE Robotics & Automation Magazine, 22 (1), 106-117.

Ramachandran et al., "All-fabric wearable electroadhesive clutch," Advanced Materials Technologies, 2019, 4(2), 1800313, 7 pages.

Rothemund et al., "HASEL artificial muscles for a new generation of lifelike robots-recent progress and future opportunities," Advanced Materials, 2021, 33(19), 2003375, 28 pages.

Sinclair et al., "Capstancrunch: A haptic VR controller with user-supplied force feedback," Proceedings of the 32nd Annual ACM Symposium on User Interface Software and Technology, 2019, 815-829.

Sogard et al., "Analysis of Coulomb and Johnsen-Rahbek electrostatic chuck performance for extreme ultraviolet lithography," Journal of Vacuum Science & Technology. B, Microelectronics and nanometer structures processing, measurement and phenomena, 2007, 25(6), 2155-2161.

Strong et al., "An electrotactile display," IEEE Transactions on Man-Machine Systems, 1970, 11(1), 72-79.

Stuart, I. M., "Capstan equation for strings with rigidity," British Journal of Applied Physics, 1961, 12(10), 559-562.

Sun et al., "Electro-Adhesive Tubular Clutch for Variable-Stiffness Robots", IEEE/RSJ International Conference on Intelligent Robots and Systems (IROS), 2022, 9628-9634.

Transeth et al., "A survey on snake robot modeling and locomotion," Robotica, 2009, 27(7), 999-1015.

Tsai et al., "Design of Tendon-Driven Manipulators," Journal of Vibration and Acoustics, 1995, 117(B), 80-86, 23 pages.

Wang et al., "Electrostatic layer jamming variable stiffness for soft robotics," IEEE/ASME Transactions on Mechatronics, 2019, 24(2), 424-433.

Watanabe et al., "Relationship between electrical resistivity and electrostatic force of alumina electrostatic chuck," Japanese Journal of Applied Physics, 1993, vol. 32, Part 1, No. 2, 864-871.

Wei et al., "Electrostatic adhesion clutch with superhigh force density achieved by mxene-poly(vinylidene fluoride-trifluoroethylene-chlorotrifluoroethylene) composites," Soft Robotics, 2023, 10(3), 482-492.

Cacucciolo et al., "Delicate yet strong: Characterizing the electroadhesion lifting force with a soft gripper," 2nd IEEE International Conference on Soft Robotics (RoboSoft), 2019, 108-113.

* cited by examiner

ELECTROSTATIC CLUTCH

CROSS REFERENCE TO RELATED APPLICATION

The present application claims priority to U.S. provisional application No. 63/589,536, filed on Oct. 11, 2023, the contents of which are hereby incorporated by reference.

STATEMENT REGARDING FEDERALLY SPONSORED RESEARCH OR DEVELOPMENT

This invention was made with government support under Grant No. CRADA 19-005, awarded by the U.S. Army Research Laboratory. The government has certain rights in the invention.

BACKGROUND

Clutches are used in many mechanical systems to selectively link and unlink the motion of various components. In mechanical systems, conventional clutches often are too large, too massive, and consume too much power when in a holding state.

SUMMARY

A first example is an electrostatic clutch comprising: a shaft comprising a first layer that is electrically conductive; a hold attachment rotatably coupled to the shaft; a tension band comprising a second layer that is electrically conductive, wherein the tension band is wrapped around the shaft such that a first end of the tension band is coupled to the hold attachment; a dielectric material disposed between the first layer and the second layer; and a load attachment rotatably coupled to the shaft, wherein the electrostatic clutch is configured to perform functions comprising: operating in an engaged mode wherein a voltage applied between the first layer and the second layer causes the tension band to clasp the shaft and the load attachment and the hold attachment to be rotationally locked to the shaft; and operating in a disengaged mode wherein the voltage is absent and the shaft can rotate freely with respect to the load attachment and the hold attachment.

A second example is a method of operating the electrostatic clutch of the first example, the method comprising applying the voltage to cause the tension band to clasp the shaft and the load attachment and the hold attachment to be rotationally locked to the shaft.

When the term "substantially" or "about" is used herein, it is meant that the recited characteristic, parameter, or value need not be achieved exactly, but that deviations or variations, including, for example, tolerances, measurement error, measurement accuracy limitations, and other factors known to those of skill in the art may occur in amounts that do not preclude the effect the characteristic was intended to provide. In some examples disclosed herein, "substantially" or "about" means within +/−0-5% of the recited value.

The following publication is hereby incorporated by reference: Timothy E. Amish, Jeffrey T. Auletta, Chad C. Kessens, Joshua R. Smith, and Jeffrey I. Lipton; Johnsen-Rahbek Capstan Clutch: A High Torque Electrostatic Clutch; 2024 IEEE International Conference on Robotics and Automation (ICRA 2024) May 13-17, 2024, Yokohama, Japan; https://doi.org/10.48550/arXiv.2312.12566.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

DETAILED DESCRIPTION

The electrostatic clutch described herein can help realize mechanical systems that are smaller and lighter, and that consume less power when in a holding state. The electrostatic clutch utilizes the Johnsen-Rahbek effect and/or the Capstan effect to provide added holding power between a load attachment and a hold attachment without requiring additional input energy.

The electrostatic clutch includes a shaft comprising a first layer that is electrically conductive. Typically, the shaft is an annular cylinder fully formed of an electrically conductive material such that the first layer includes the entire shaft, but other examples are possible. The electrostatic clutch also includes a hold attachment rotatably coupled to the shaft. Generally, the hold attachment is formed of an electrically insulating material. The electrostatic clutch also includes a tension band including a second layer that is electrically conductive. For example, the tension band takes the form of a stainless steel strip that is wrapped one or more times around the shaft. In this example, the second layer makes up the entire tension band. A first end of the tension band is coupled to the hold attachment, for example, via a clamp and a ball bearing, or via a bolt. The electrostatic clutch also includes a dielectric material, such as a polymer, disposed between the first layer and the second layer. The dielectric material provides electrical insulation between the conductive portion of the shaft and the conductive portion of the tension band. The electrostatic clutch also includes a load attachment rotatably coupled to the shaft. The electrostatic clutch is configured to operate in an engaged mode wherein a voltage applied between the first layer of the shaft and the second layer of the tension band causes the tension band to clasp the shaft and the load attachment and the hold attachment to be rotationally locked to the shaft. That is, the load attachment and the hold attachment rotate in unison with the shaft in the engaged mode. The electrostatic clutch is also configured to operate in a disengaged mode wherein the voltage is absent and the shaft can rotate freely with respect to the load attachment and the hold attachment.

Figure 1:
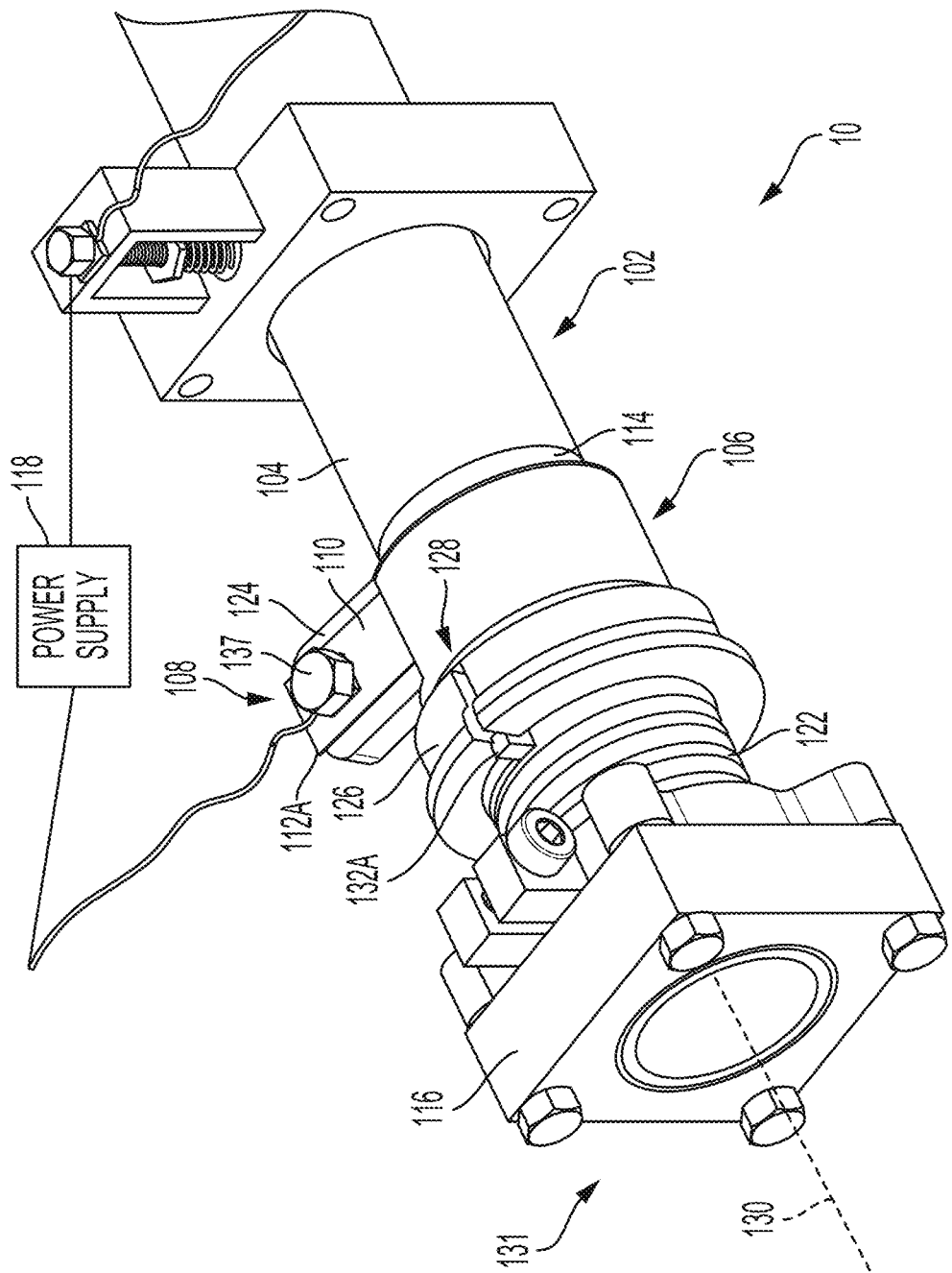
FIG. 1 is a perspective view of an electrostatic clutch, according to an example.

FIG. 1 is a perspective view of an electrostatic clutch 10. The electrostatic clutch 10 includes a shaft 102 comprising a layer 104 that is electrically conductive. The shaft 102 can take the form of an annular cylinder (e.g., a tube) made of an electrically conductive material such as aluminum or stainless steel. In this example, the layer 104 of electrically conductive material makes up the entirety of the shaft 102, but in other examples the shaft 102 could be partially formed of or include layers of electrically insulative or semiconducting material. The electrostatic clutch 10 typically generates a stronger holding force when the layer 104 is at the most radially outward portion of the shaft 102, as described in more detail below.

The electrostatic clutch 10 also includes a hold attachment 106 rotatably coupled to the shaft 102 and a tension band 108 that includes a layer 110 that is electrically conductive. During assembly, the hold attachment 106 can be slid onto the shaft 102 at an end of the shaft 102. The hold attachment 106 can be formed of insulative material, such as a ceramic or a plastic, but other examples are possible. An inner circumference of the hold attachment 106 conforms to an outer circumference of the shaft 102, but the fit is loose enough to permit rotational movement of the hold attachment 106 about a longitudinal axis 130 of the shaft 102 when the electrostatic clutch 10 is disengaged. The tension band 108 is wrapped around the shaft 102 under the hold attachment 106 such that an end 112A of the tension band 108 is coupled to the hold attachment 106, for example, via a bolt 137. Thus, an opposing end of the tension band 108 that is obscured by the hold attachment 106 in FIG. 1 is held against the shaft 102 by the hold attachment 106. In this example, the tension band 108 makes less than one full revolution around the shaft 102. In this example, the tension band 108 has a thickness ranging from 50 μm to 100 μm, for example 76.2 μm.

The hold attachment 106 includes a tab 124 to which the end 112A of the tension band 108 is attached. The tab 124 extends radially away from the shaft 102. The hold attachment 106 further includes a collar 126 that is rotatably coupled to the shaft 102. The collar 126 includes a slot 128 that extends substantially parallel to the longitudinal axis 130. The hold attachment 106 includes a gap through which the tension band 108 is inserted such that the end 112A is exposed and attached to the tab 124 via a bolt 137 and the opposing end of the tension band 108 is held against the shaft 102 by the collar 126. The bolt 137 allows rotation of the end 112A of the tension band 108 in a plane normal to the bolt 137.

The electrostatic clutch 10 further includes a dielectric material 114 disposed between the layer 104 and the layer 110, that is, between the shaft 102 and the tension band 108. In FIG. 1, the dielectric material 114 takes a form of a dielectric sleeve adhered to and surrounding the shaft 102 such that the dielectric material 114 makes contact with the electrically conductive layer 110 of the tension band 108. Typically, the dielectric material 114 has a thickness ranging from 35 μm to 75 μm, for example 55 μm. The dielectric material 114 can include a filled polymer, an unfilled polymer, a polyelectrolyte, or a polybenzimidazole, and can exhibit the Johnsen-Rahbek effect and/or Coulombic electroadhesion. The layer 110 of the tension band 108 can be polished on a surface facing the dielectric material 114.

In other examples, the dielectric material 114 takes the form of a dielectric layer deposited on the tension band 108 such that the dielectric layer faces and contacts the shaft 102. In this example, the electrically conductive layer 110 faces away from the shaft 102 and is on a side opposite to the dielectric layer of the tension band 108.

The electrostatic clutch 10 further includes a load attachment 116 rotatably coupled to the shaft 102. FIG. 1 shows an example in which the electrostatic clutch 10 is anchored to a table for testing purposes. In this example, load attachment 116 is anchored to the table, but in other examples, the load attachment 116 could be coupled to a robotic arm or the like.

Figure 3:
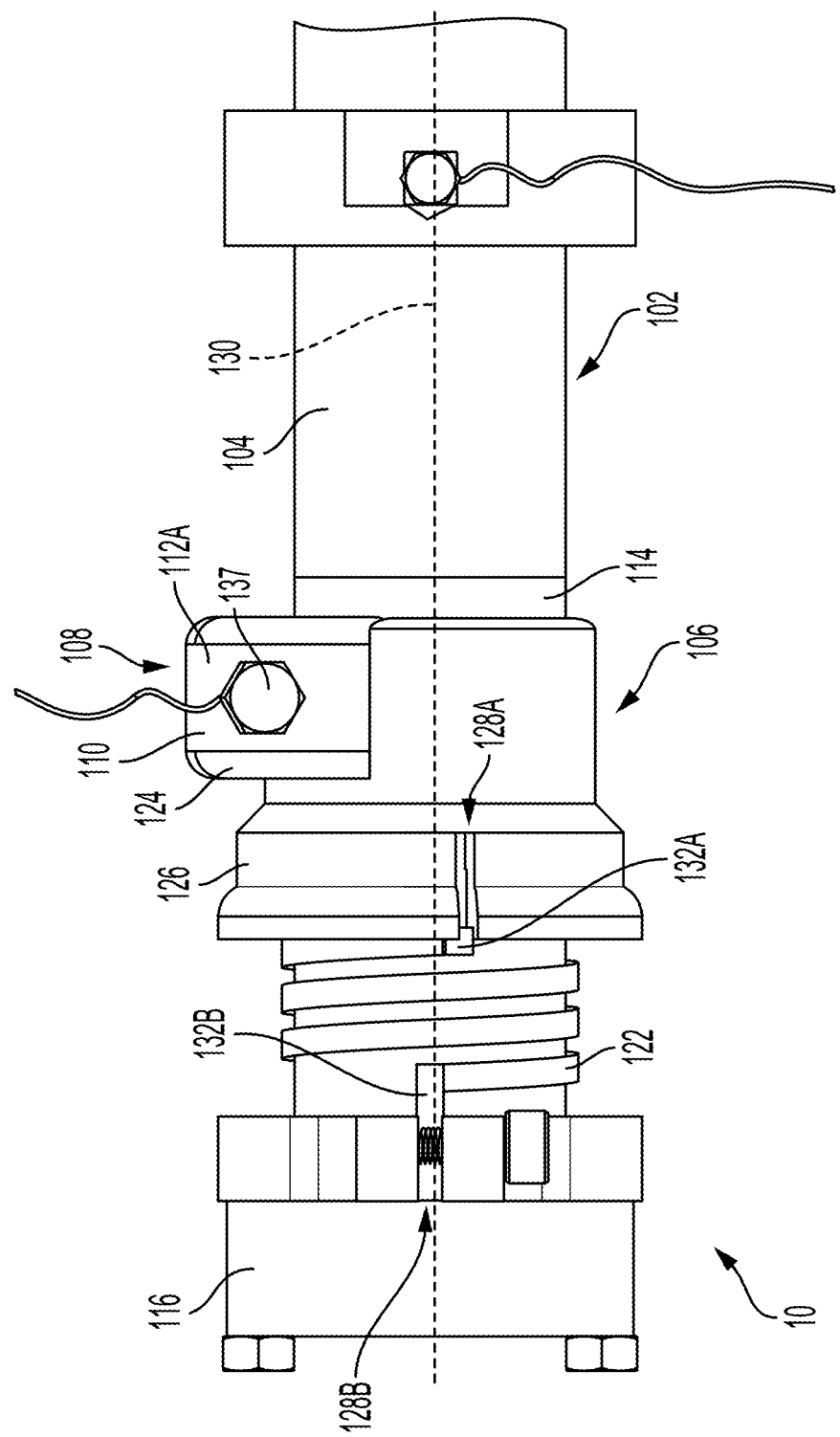
FIG. 3 is a top view of an electrostatic clutch, according to an example.

The electrostatic clutch 10 further includes a torsion spring 122 that surrounds the shaft 102 and couples the hold attachment 106 to the load attachment 116. In FIG. 1, the torsion spring 122 makes three full helical turns around the shaft 102, but other examples are possible. The torsion spring 122 includes an end 132A and an end 132B that is shown in FIG. 3. The end 132A is captured by the slot 128 and the end 132B is attached to the load attachment as shown in FIG. 3.

The electrostatic clutch 10 further includes a power supply 118 configured to apply a voltage between the layer 104 and the layer 110 to cause electrostatic attraction between the tension band 108 and the shaft 102. Typically, the voltage applied is between 1 volt and 900 volts.

The electrostatic clutch 10 is configured to operate in an engaged mode and a disengaged mode. In the engaged mode, the power supply 118 applies the voltage between the layer 104 and the layer 110, which causes the tension band 108 to clasp the shaft 102 under the hold attachment 106, and the load attachment 116 and the hold attachment 106 to be rotationally locked to the shaft 102. In the engaged mode, rotation of the shaft 102 about the longitudinal axis 130 causes the hold attachment 106 to rotate in unison with the shaft 102. Viewing the electrostatic clutch from the end 131, clockwise rotation of the shaft 102 and thus the hold attachment 106 causes the end 132A of the torsion spring 122 to rotate clockwise in unison with the slot 128. This causes the torsion spring 122 to compress the shaft 102 and bind to the shaft 102, and cause the load attachment 116 to be rotationally locked to the shaft 102 and the hold attachment 106 via the torsion spring 122 being attached to the load attachment 116. In the example shown in FIG. 1, the rotational lock prevents the shaft 102 and the hold attachment 106 from moving further clockwise because the load attachment 116 is anchored to the table. In other examples in which the load attachment 116 is not so anchored, the rotational lock causes the hold attachment 106 and the load attachment 116 to rotate in unison with the shaft 102 until the electrostatic clutch 10 is no longer operating in the engaged mode.

In the disengaged mode, the power supply 118 does not apply the voltage between the layer 104 and the layer 110, and the shaft 102 can rotate freely with respect to the load attachment 116 and the hold attachment 106. Discontinuation of the voltage causes the tension band 108 to release the shaft 102 and the shaft 102 to become free to rotate with respect to the hold attachment 106. Discontinuation of the voltage further causes the torsion spring 122 to release the shaft 102 and the shaft 102 to become free to rotate with respect to the load attachment 116.

Figure 2:
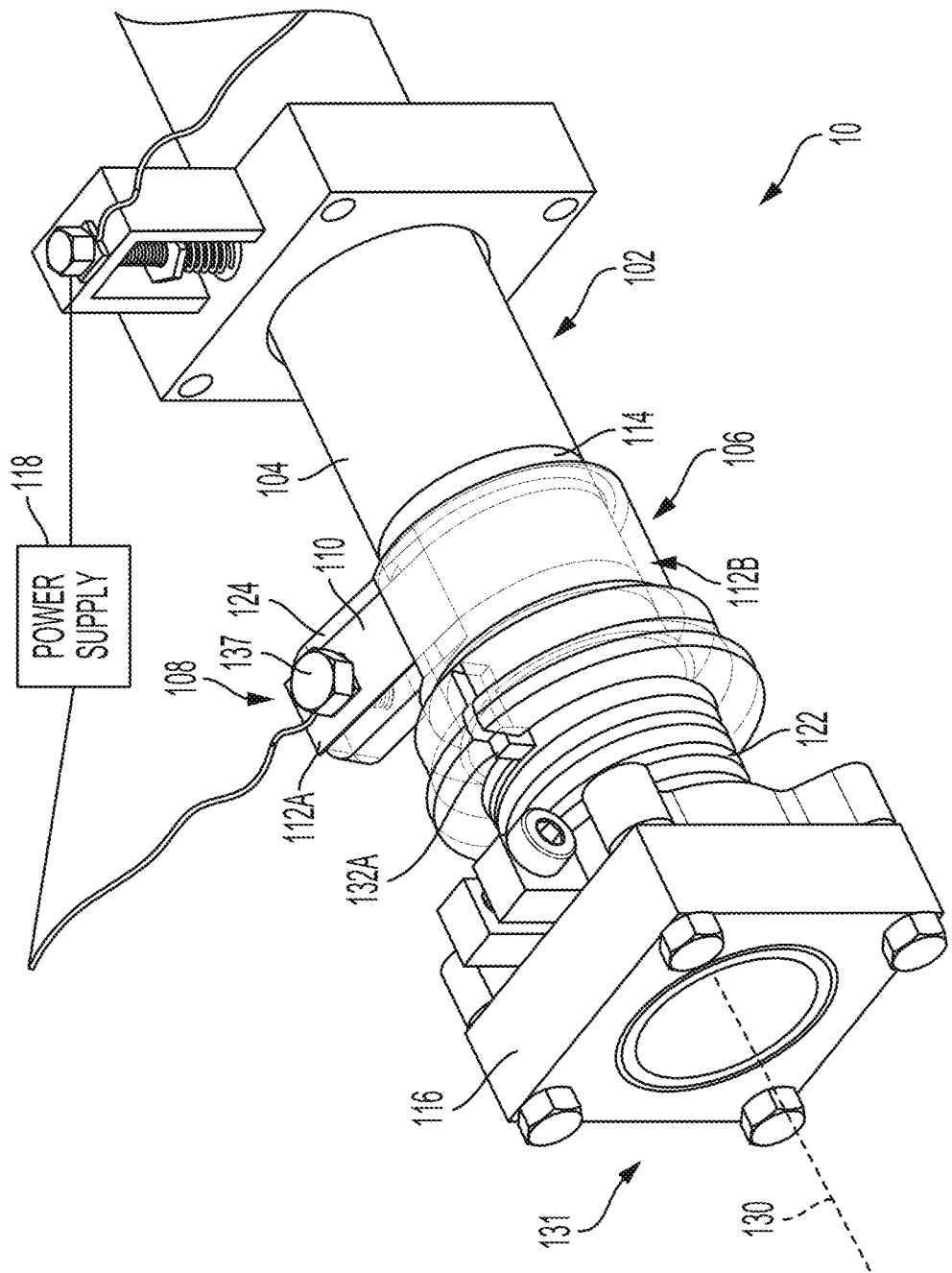
FIG. 2 is a perspective view of an electrostatic clutch, according to an example.

FIG. 2 is a perspective view of the electrostatic clutch 10, similar to FIG. 1. However, in FIG. 2 the hold attachment 106 is partially transparent to show the tension band 108 wrapped (e.g., once) around the shaft 102 between the hold attachment 106 and the dielectric material 114. The end 112B of the tension band 108 is behind the shaft 102.

FIG. 3 is a top view of the electrostatic clutch 10. FIG. 3 shows the end 132B being captured by a slot 128B formed in the load attachment 116. Thus, in the engaged mode, downward rotation with respect to the viewpoint of FIG. 3 by the shaft 102 and the hold attachment 106 causes the end 132A to move downward with respect to the end 132B and the load attachment, thereby causing the torsion spring 122 to compress and bind to the shaft 102.

Figure 4:
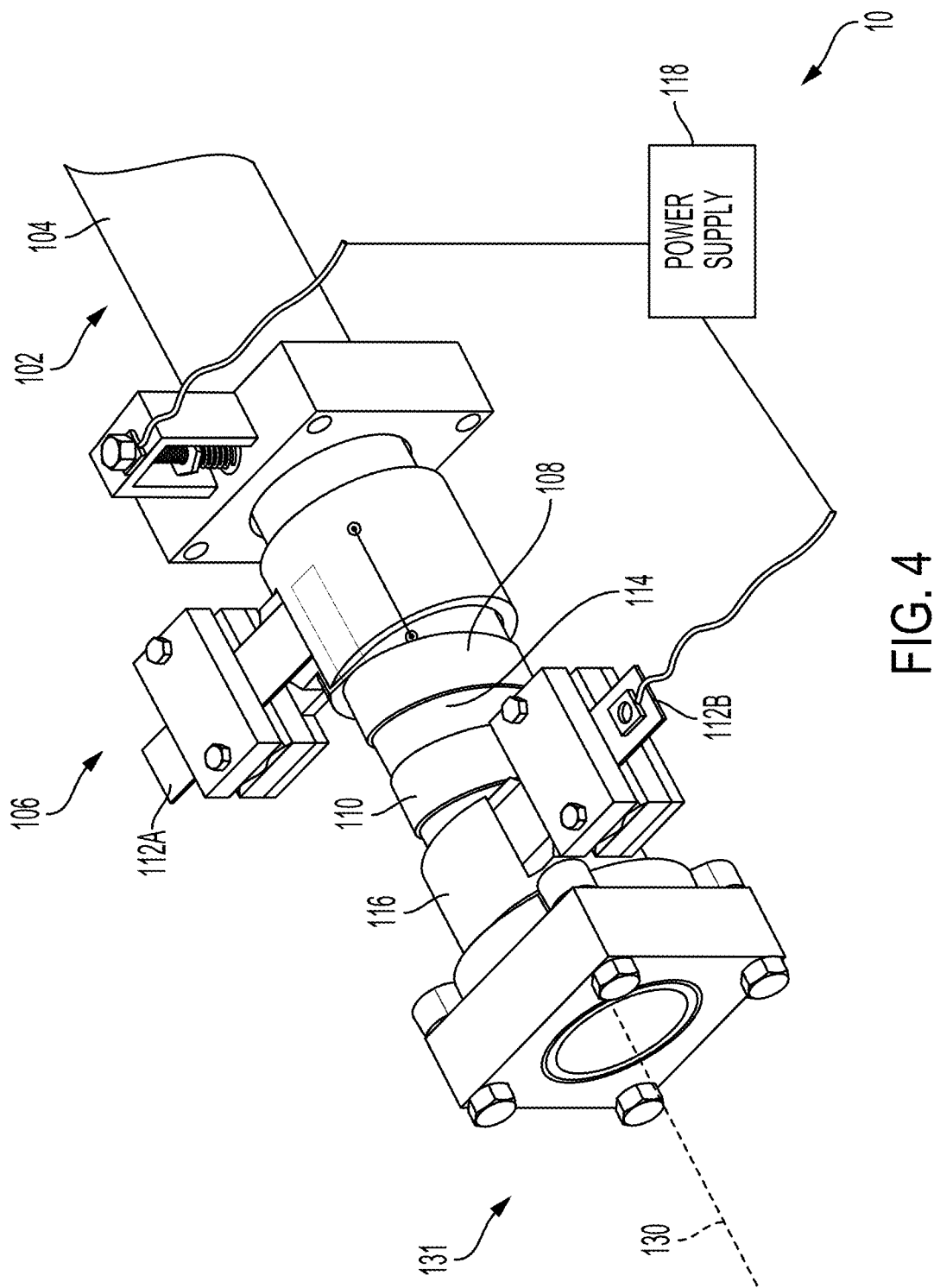
FIG. 4 is a perspective view of an electrostatic clutch, according to an example.

FIG. 4 is a perspective view of another example of the electrostatic clutch 10. Any of the features or functionality of the electrostatic clutch shown in FIGS. 1-3 can apply to the electrostatic clutch 10 shown in FIG. 4, subject to any differences described below.

In FIG. 4, the tension band 108 is wrapped helically around the shaft 102 multiple times. The load attachment 116 is coupled to the hold attachment 106 via the end 112B of the tension band 108. The load attachment 116 includes a clamp that secures the end 112B to the load attachment 116 and a ball bearing that facilitates contact between the tension band 108 and the shaft 102. The hold attachment 106 includes a clamp that secures the end 112A to the hold attachment 106 and a ball bearing that facilitates contact between the tension band 108 and the shaft 102.

The tension band 108 passes through the clamp of the hold attachment 106 and makes several turns about the shaft 102 over the dielectric material 114. The tension band 108 also passes through the clamp of the load attachment 116. The electrostatic clutch 10 shown in FIG. 4 does not include a torsion spring. Instead, the tension band 108 couples the hold attachment 106 to the load attachment 116. In this example, the tension band 108 has a thickness ranging from 5 μm to 45 μm, for example 25.4 μm.

The electrostatic clutch 10 is configured to operate in an engaged mode and a disengaged mode. In the engaged mode, the power supply 118 applies the voltage between the layer 104 and the layer 110, which causes the tension band 108 to clasp and/or compress the shaft 102 over the dielectric material 114, and the load attachment 116 and the hold attachment 106 to be rotationally locked to the shaft 102. In the engaged mode, rotation of the shaft 102 about the longitudinal axis 130 causes the hold attachment 106 and the load attachment 116 to rotate in unison with the shaft 102.

In the disengaged mode, the power supply 118 does not apply the voltage between the layer 104 and the layer 110, and the shaft 102 can rotate freely with respect to the load attachment 116 and the hold attachment 106. Discontinuation of the voltage causes the tension band 108 to release the shaft 102 and the shaft 102 to become free to rotate with respect to the hold attachment 106.

Figure 5:
FIG. 5 is a block diagram of a method, according to an example.

FIG. 5 is a block diagram of a method 200 for operating the electrostatic clutch 10. As shown in FIG. 5, the method 200 includes one or more operations, functions, or actions as illustrated by blocks 202 and 204. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes the power supply 118 applying the voltage to cause the tension band 108 to clasp the shaft 102 and the load attachment 116 and the hold attachment 106 to be rotationally locked to the shaft 102. Functionality related to block 202 is discussed above with reference to FIGS. 1-4.

At block 204, the method 200 includes the power supply 118 discontinuing applying the voltage to cause the shaft 102 to release from the tension band 108 and to become free to rotate with respect to the hold attachment 106 and the load attachment 116. Functionality related to block 204 is discussed above with reference to FIGS. 1-4.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. An electrostatic clutch comprising:
   a shaft comprising a first layer that is electrically conductive;
   a hold attachment rotatably coupled to the shaft;
   a tension band comprising a second layer that is electrically conductive, wherein the tension band is wrapped around the shaft such that a first end of the tension band is coupled to the hold attachment;
   a dielectric material disposed between the first layer and the second layer; and
   a load attachment rotatably coupled to the shaft, wherein the electrostatic clutch is configured to perform functions comprising:
   operating in an engaged mode wherein a voltage applied between the first layer and the second layer causes the tension band to clasp the shaft and the load attachment and the hold attachment to be rotationally locked to the shaft; and
   operating in a disengaged mode wherein the voltage is absent and the shaft can rotate freely with respect to the load attachment and the hold attachment.

2. The electrostatic clutch of claim 1, further comprising a power supply configured to apply the voltage.

3. The electrostatic clutch of claim 1, wherein the voltage applied causes electrostatic attraction between the tension band and the shaft.

4. The electrostatic clutch of claim 1, wherein the dielectric material takes a form of a dielectric sleeve surrounding the shaft.

5. The electrostatic clutch of claim 1, wherein the dielectric material takes a form of a dielectric layer deposited on the tension band such that the dielectric layer faces the shaft.

6. The electrostatic clutch of claim 1, wherein the dielectric material comprises a polymer.

7. The electrostatic clutch of claim 1, wherein the dielectric material comprises a polyelectrolyte or polybenzimidazole.

8. The electrostatic clutch of claim 1, wherein the dielectric material comprises a material that exhibits a Johnsen-Rahbek effect.

9. The electrostatic clutch of claim 1, wherein the dielectric material comprises a material that exhibits Coulombic electroadhesion.

10. The electrostatic clutch of any claim 1, wherein the tension band is wrapped helically around the shaft.

11. The electrostatic clutch of claim 1, wherein the tension band is polished on a surface facing the dielectric material.

12. The electrostatic clutch of claim 1, wherein the hold attachment comprises:
   a tab to which the first end of the tension band is attached, the tab extending away from the shaft; and
   a collar that is rotatably coupled to the shaft, the collar comprising a slot that extends substantially parallel to a longitudinal axis of the shaft.

13. The electrostatic clutch of claim 12, further comprising a torsion spring that surrounds the shaft, the torsion spring comprising a first end and a second end, wherein the first end of the torsion spring is captured by the slot and the second end of the torsion spring is attached to the load attachment.

14. The electrostatic clutch of claim 13, wherein operating in the engaged mode comprises applying the voltage to cause:

the tension band to clasp the shaft and the hold attachment to rotate the first end of the torsion spring via rotation of the shaft; and the torsion spring to clasp the shaft and the load attachment to be rotationally locked to the shaft and the hold attachment.

15. The electrostatic clutch of claim 14, wherein operating in the disengaged mode comprises discontinuing applying the voltage to cause:

the tension band to release the shaft and the shaft to become free to rotate with respect to the hold attachment; and the torsion spring to release the shaft and the shaft to become free to rotate with respect to the load attachment.

16. The electrostatic clutch of claim 1, wherein a second end of the tension band is held against the shaft by the hold attachment.

17. A method of operating the electrostatic clutch of claim 1, the method comprising applying the voltage to cause the tension band to clasp the shaft and the load attachment and the hold attachment to be rotationally locked to the shaft.

18. The method of claim 17, further comprising discontinuing applying the voltage to cause the shaft to release from the tension band and to become free to rotate with respect to the hold attachment and the load attachment.

19. An electrostatic clutch comprising:

a shaft comprising a first layer that is electrically conductive;

a hold attachment rotatably coupled to the shaft;

a tension band comprising a second layer that is electrically conductive, wherein the tension band is wrapped around the shaft such that a first end of the tension band is coupled to the hold attachment;

a dielectric material disposed between the first layer and the second layer; and a load attachment rotatably coupled to the shaft, wherein the electrostatic clutch is configured to perform functions comprising:

operating in an engaged mode wherein a voltage applied between the first layer and the second layer causes the tension band to clasp the shaft and the load attachment and the hold attachment to be rotationally locked to the shaft; and operating in a disengaged mode wherein the voltage is absent and the shaft can rotate freely with respect to the load attachment and the hold attachment, wherein the load attachment is coupled to the hold attachment via a second end of the tension band.

20. An electrostatic clutch comprising:

a shaft comprising a first layer that is electrically conductive;

a hold attachment rotatably coupled to the shaft;

a tension band comprising a second layer that is electrically conductive, wherein the tension band is wrapped around the shaft such that a first end of the tension band is coupled to the hold attachment;

a dielectric material disposed between the first layer and the second layer; and a load attachment rotatably coupled to the shaft; and a torsion spring that surrounds the shaft and couples the hold attachment to the load attachment, wherein the electrostatic clutch is configured to perform functions comprising:

operating in an engaged mode wherein a voltage applied between the first layer and the second layer causes the tension band to clasp the shaft and the load attachment and the hold attachment to be rotationally locked to the shaft; and operating in a disengaged mode wherein the voltage is absent and the shaft can rotate freely with respect to the load attachment and the hold attachment.

* * * * *